(12) United States Patent
Iida et al.

(10) Patent No.: US 12,203,527 B2
(45) Date of Patent: Jan. 21, 2025

(54) DAMPING FORCE ADJUSTABLE SHOCK ABSORBER

(71) Applicant: Hitachi Astemo, Ltd., Ibaraki (JP)

(72) Inventors: Tomohiko Iida, Hitachinaka (JP); Kosuke Kadokura, Hitachinaka (JP); Kento Monji, Hitachinaka (JP); Shunsuke Mori, Hitachinaka (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 447 days.

(21) Appl. No.: 17/615,928

(22) PCT Filed: May 26, 2020

(86) PCT No.: PCT/JP2020/020746
§ 371 (c)(1),
(2) Date: Dec. 2, 2021

(87) PCT Pub. No.: WO2020/246315
PCT Pub. Date: Dec. 10, 2020

(65) Prior Publication Data
US 2022/0316547 A1   Oct. 6, 2022

(30) Foreign Application Priority Data

Jun. 5, 2019   (JP) .................. 2019-105460

(51) Int. Cl.
*F16F 9/46*   (2006.01)
*F16F 9/18*   (2006.01)
*F16F 9/34*   (2006.01)

(52) U.S. Cl.
CPC ............... *F16F 9/465* (2013.01); *F16F 9/18* (2013.01); *F16F 9/34* (2013.01); *F16F 2222/12* (2013.01);
(Continued)

(58) Field of Classification Search
CPC ...... F16F 9/465; F16F 9/18; F16F 9/34; F16F 2222/12; F16F 2228/066; F16F 2232/08; F16F 2234/02
(Continued)

(56) References Cited

U.S. PATENT DOCUMENTS

| | | | | |
|---|---|---|---|---|
| 5,850,896 A | * | 12/1998 | Tanaka ................... | F16F 9/465 188/266.2 |
| 6,003,644 A | * | 12/1999 | Tanaka ................... | F16F 9/465 188/266.5 |

(Continued)

FOREIGN PATENT DOCUMENTS

| | | |
|---|---|---|
| JP | 2012-215220 | 11/2012 |
| JP | 2015-132313 | 7/2015 |

(Continued)

OTHER PUBLICATIONS

International Search Report issued Aug. 25, 2020 in corresponding International (PCT) Patent Application No. PCT/JP2020/020746.
(Continued)

*Primary Examiner* — Bradley T King
*Assistant Examiner* — James K Hsiao
(74) *Attorney, Agent, or Firm* — Wenderoth, Lind & Ponack, L.L.P.

(57) ABSTRACT

When a damping force adjustable shock absorber operates in a soft mode, a piston is performing a compression stroke, and a piston speed falls within an ultra low speed range, communication between an upper cylinder chamber and a reservoir is interrupted by an ultra low speed valve provided in a pilot passage. The interruption of communication enables expansion of an oil liquid in the upper cylinder chamber when the piston is performing the compression stroke and the piston speed falls within the ultra low speed range. A differential pressure is generated between an upper (Continued)

cylinder chamber side and a lower cylinder chamber side of a compression-side ultra low speed valve. As a result, when the piston speed falls within the ultra low speed range, the compression-side ultra low speed valve is opened, and a damping force having a valve characteristic achieved by the ultra low speed valve can be generated.

10 Claims, 8 Drawing Sheets

(52) U.S. Cl.
CPC ..... *F16F 2228/066* (2013.01); *F16F 2232/08* (2013.01); *F16F 2234/02* (2013.01)

(58) Field of Classification Search
USPC ...................................................... 188/266.2
See application file for complete search history.

(56) References Cited

U.S. PATENT DOCUMENTS

| | | | | |
|---|---|---|---|---|
| 6,119,829 | A * | 9/2000 | Nakadate | F16F 9/348 188/266.6 |
| 9,488,244 | B2 * | 11/2016 | Mizuno | F16F 9/3482 |
| 11,761,508 | B2 * | 9/2023 | Conti | F16F 9/34 188/266.2 |
| 2009/0242339 | A1 * | 10/2009 | Nakadate | F16F 9/464 188/266.5 |
| 2011/0147147 | A1 * | 6/2011 | Murakami | F16F 9/464 188/314 |
| 2012/0048666 | A1 * | 3/2012 | Murakami | F16F 9/348 188/315 |
| 2012/0247889 | A1 | 10/2012 | Yabe et al. | |
| 2012/0305349 | A1 * | 12/2012 | Murakami | F16F 9/325 188/266.6 |
| 2014/0262654 | A1 * | 9/2014 | Roessle | F16F 9/46 188/315 |
| 2014/0291088 | A1 * | 10/2014 | Katayama | F16F 9/341 188/313 |
| 2014/0353099 | A1 * | 12/2014 | Yamashita | F16F 9/512 188/314 |
| 2015/0198214 | A1 | 7/2015 | Mizuno | |
| 2015/0217621 | A1 * | 8/2015 | Yamashita | B60G 13/08 188/266.2 |
| 2016/0061284 | A1 * | 3/2016 | Yamashita | F16F 9/3415 188/313 |
| 2018/0245660 | A1 * | 8/2018 | Yamashita | F16F 9/34 |
| 2018/0259029 | A1 * | 9/2018 | Yamashita | F16F 9/5126 |

FOREIGN PATENT DOCUMENTS

| | | |
|---|---|---|
| JP | 2016-512316 | 4/2016 |
| JP | 2019-27460 | 2/2019 |

OTHER PUBLICATIONS

Written Opinion issued Aug. 25, 2020 in corresponding International (PCT) Patent Application No. PCT/JP2020/020746.

* cited by examiner

DAMPING FORCE ADJUSTABLE SHOCK ABSORBER

TECHNICAL FIELD

The present invention relates to a damping force adjustable shock absorber that adjusts a damping force by controlling a flow of a working fluid caused along with a stroke of a piston rod.

BACKGROUND ART

In Patent Literature 1, there is disclosed a shock absorber including an ultra low speed valve. The ultra low speed valve is opened when a piston speed falls within an ultra low speed range corresponding to an extremely initial period in which the shock absorber starts operating. Further, in Patent Literature 2, there is disclosed a damping force adjustable shock absorber of a so-called control-valve side-mounting type. In the damping force adjustable shock absorber of the control-valve side-mounting type, a damping force generating mechanism including a solenoid is horizontally mounted to a side wall of an outer cylinder.

The damping force adjustable shock absorber described in Patent Literature 2 includes a lower cylinder chamber that always communicates with a reservoir via an orifice of a base valve. Further, the damping force adjustable shock absorber includes a pilot valve (control valve). When a damping force falls within a soft characteristic range, the pilot valve is opened. An upper cylinder chamber always communicates with the reservoir via an introduction orifice. Thus, when the ultra low speed valve described in Patent Literature 1 is directly used in a piston of the damping force adjustable shock absorber described in Patent Literature 2, it takes long time to generate a differential pressure that is required to open the ultra low speed valve. Thus, the damping force cannot be adjusted when the piston speed falls within the ultra low speed range.

CITATION LIST

Patent Literature

PTL 1: JP 2015-132313 A
PTL 2: JP 2012-215220 A

SUMMARY OF INVENTION

Technical Problem

The present invention has an object to provide a damping force adjustable shock absorber capable of adjusting a damping force when a piston speed falls within an ultra low speed range.

Solution to Problem

According to one embodiment of the present invention, there is provided a damping force adjustable shock absorber, including: a cylinder sealingly enclosing a working fluid; a piston slidably fitted into the cylinder; a valve mechanism, which is provided to the piston, and is configured to regulate a flow of the working fluid to generate a damping force; a piston rod, which is coupled to the piston, and extends to an outside of the cylinder; and a damping force adjustment mechanism configured to adjust the damping force, which is to be generated, by controlling the flow of the working fluid in the cylinder, which is caused by sliding of the piston, the damping force adjustment mechanism including: a main valve to be opened under a pressure of the working fluid; a pilot chamber configured to exert a pressure on the main valve in a valve-closing direction; an introduction orifice configured to introduce the working fluid into the pilot chamber; a pilot passage configured to allow communication between a downstream side of the introduction orifice and both of a downstream side of the pilot chamber and a downstream side of the main valve; and a control valve provided in the pilot passage, wherein a low speed valve mechanism is provided in the pilot chamber, the low speed valve mechanism having a flow passage area that is increased when a piston speed reaches a given piston speed lower than a piston speed at which the main valve is opened.

According to one embodiment of the present invention, it is possible to provide a damping force adjustable shock absorber capable of adjusting a damping force when a piston speed falls within an ultra low speed range.

DESCRIPTION OF EMBODIMENTS (First Embodiment) A first embodiment of the present invention is described with reference to the accompanying drawings. For convenience of description, a vertical direction in FIG. 1 is directly used as "vertical direction" in the specification.

Figure 1:
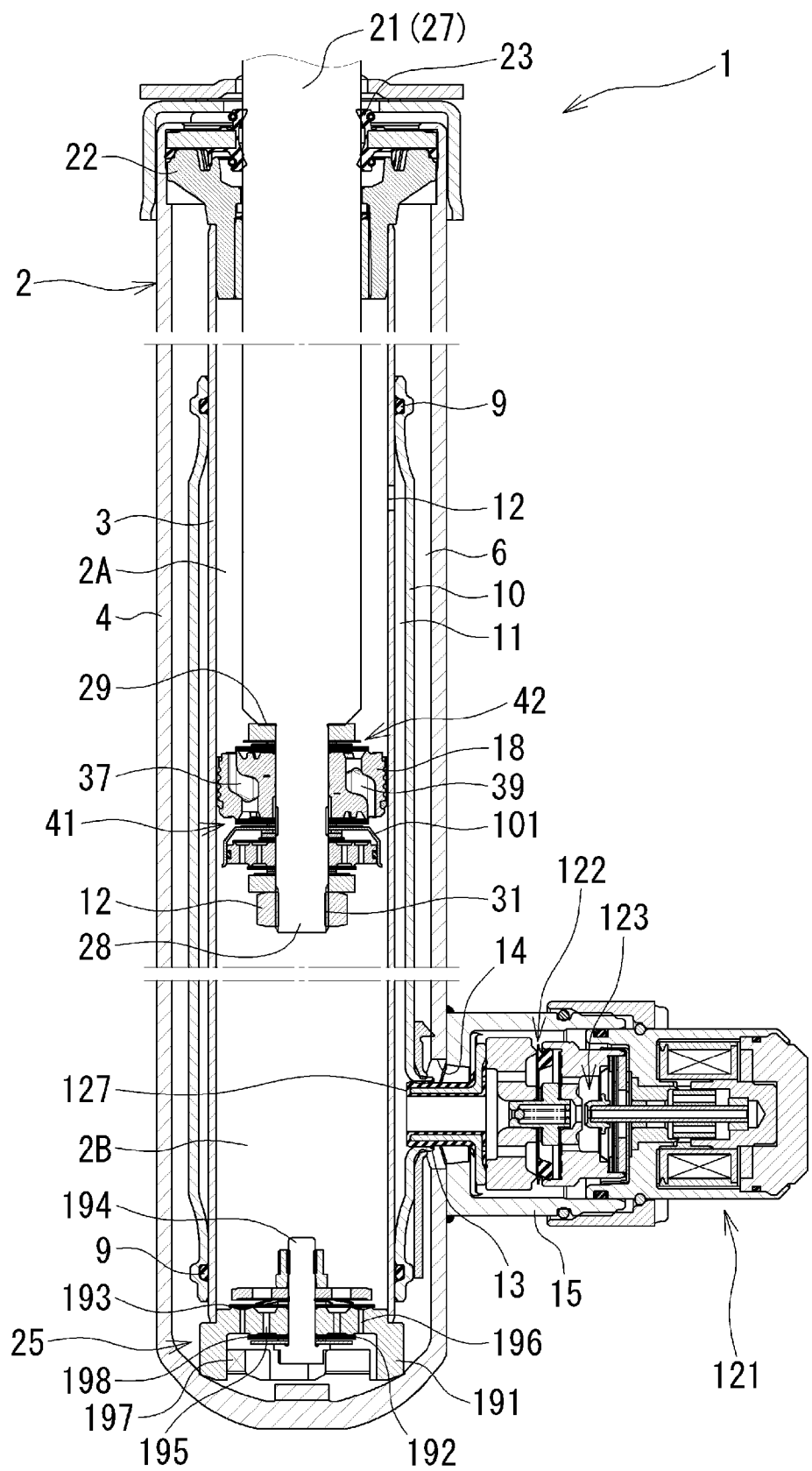
FIG. 1 is a sectional view of a damping force adjustable shock absorber according to a first embodiment.

As illustrated in FIG. 1, a damping force adjustable shock absorber 1 according to a first embodiment is a damping force adjustable shock absorber of a so-called control-valve side-mounting type in which a damping force adjustment mechanism 121 is horizontally mounted to a cylinder 2. The cylinder 2 includes an inner cylinder 3 and an outer cylinder 4. The outer cylinder 4 is arranged coaxially with the inner cylinder 3. A reservoir 6 is defined between the inner cylinder 3 and the outer cylinder 4. An oil liquid (working liquid) is sealingly enclosed in the inner cylinder 3, and the oil liquid and a gas are sealingly enclosed in the reservoir 6.

A piston 18, which partitions a space inside the inner cylinder 3 into an upper cylinder chamber 2A (first chamber) and a lower cylinder chamber 2B (second chamber), is slidably fitted into the inner cylinder 3 of the cylinder 2. A lower end (one end) of a piston rod 21 is coupled to the piston 18. An upper end (another end) of the piston rod 21 passes through the upper cylinder chamber 2A, is inserted into a rod guide 22 and a sealing member 23 that are mounted to an upper end of the cylinder 2, and extends to an outside of the cylinder 2. The piston rod 21 includes a main shaft portion 27 and a mounting shaft portion 28. The main shaft portion 27 is guided by the rod guide 22. The piston 18 is mounted to the mounting shaft portion 28. A step portion 29 is formed between the main shaft portion 27 and the mounting shaft portion 28. The mounting shaft portion 28 has a threaded portion 31 formed at its lower end.

Figure 2:
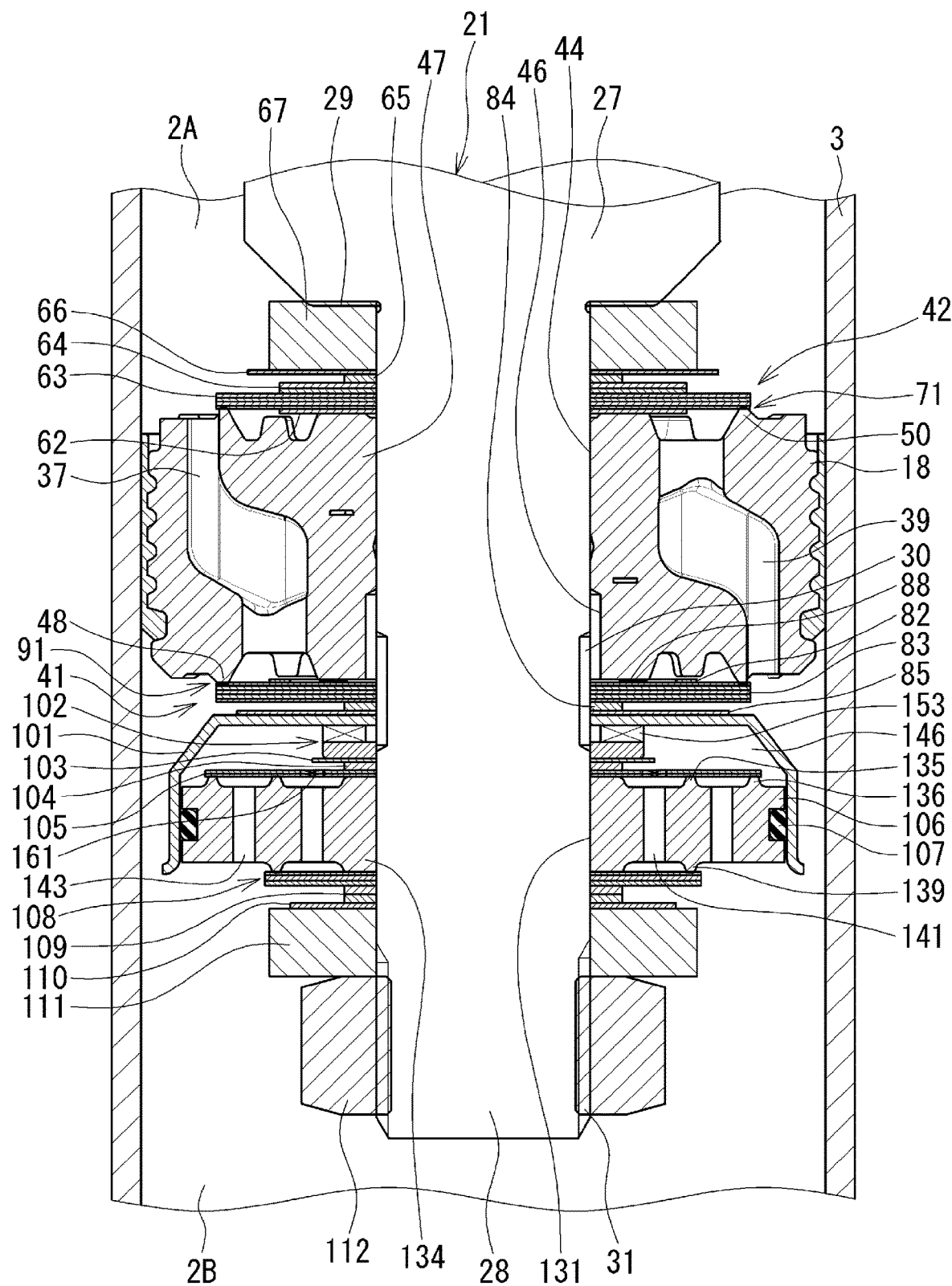
FIG. 2 is an enlarged view of an area around a piston illustrated in FIG. 1.

As illustrated in FIG. 2, passages 37 and 39 that allow communication between the upper cylinder chamber 2A and the lower cylinder chamber 2B are defined in the piston 18. The passage 37 (extension-side passage) has an open end on the upper cylinder chamber 2A side, which is located on a radially outer side of the piston 18, and an open end on the lower cylinder chamber 2B side, which is located on the radially inner side of the piston 18. Meanwhile, the passage 39 (compression-side passage) has an open end on the lower cylinder chamber 2B side, which is located on the radially outer side of the piston 18, and an open end on the upper cylinder chamber 2A side, which is located on a radially inner side of the piston 18.

An extension-side first damping force generating mechanism 41 is provided on a side of the passage 37 (extension-side passage), which is closer to the lower cylinder chamber 2B. The extension-side first damping force generating mechanism 41 generates a damping force by controlling a flow of the oil liquid from the upper cylinder chamber 2A via the passage 37 into the lower cylinder chamber 2B. Meanwhile, a compression-side first damping force generating mechanism 42 is provided on a side of the passage 39 (compression-side passage), which is closer to the upper cylinder chamber 2A. The compression-side first damping force generating mechanism 42 generates a damping force by controlling a flow of the oil liquid flowing from the lower cylinder chamber 2B via the passage 39 into the upper cylinder chamber 2A.

The compression-side first damping force generating mechanism 42 includes a seat portion 50 having an annular shape. The seat portion 50 is formed on a radially outer region of an end surface of the piston 18, which is on a side closer to the upper cylinder chamber 2A of the piston 18. A retainer 62, a disc valve 63, a plurality of retainers 64, a spacer 65, a retainer 66, and an annular member 67 are provided in the stated order from the piston 18 side between a clamp portion 47 of the piston 18 and the step portion 29 of the piston rod 21. The disc valve 63 includes a plurality of discs. These members are included in the compression-side first damping force generating mechanism 42.

The compression-side first damping force generating mechanism 42 includes an intake valve 71 (first low speed valve) that allows a flow of the oil liquid from the lower cylinder chamber 2B (second chamber) via the passage 39 toward the upper cylinder chamber 2A (first chamber). The intake valve 71 includes the seat portion 50 having an annular shape and the disc valve 63. The disc valve 63 can be seated on and separated from the seat portion 50. The passage 39 is opened on the upper cylinder chamber 2A side toward a radially inner side of the seat portion 50. The disc valve 63 of the compression-side damping force generating mechanism 42 does not include a fixed orifice, which allows the lower cylinder chamber 2B and the upper cylinder chamber 2A to always communicate with each other.

The extension-side first damping force generating mechanism 41 includes a seat portion 48 having an annular shape. The seat portion 48 is formed on a radially outer region of an end surface of the piston 18, which is on a side closer to the lower cylinder chamber 2B of the piston 18. A retainer 82, a disc valve 83, a spacer 84, and a retainer 85 are provided in the stated order from the piston 18 side between a clamp portion 47 of the piston 18 and a cap 101 to be described later. The disc valve 83 includes a plurality of discs. These members are included in the extension-side first damping force generating mechanism 41.

The extension-side first damping force generating mechanism 41 includes a main valve 91 that allows a flow of the oil liquid from the upper cylinder chamber 2A (first chamber) via the passage 37 toward the lower cylinder chamber 2B (second chamber). The main valve 91 includes the seat portion 48 having an annular shape and the disc valve 83. The disc valve 83 can be seated on and separated from the seat portion 48. The retainer 82 has an orifice 88 (cutout). The orifice 88 allows the passage 37 to always communicate with a passage 30 defined in the mounting shaft portion 28 of the piston rod 21 via an annular passage 46. The annular passage 46 is defined between a large-diameter portion of an insertion hole 44 (shaft hole) of the piston 18 and the mounting shaft portion 28. The passage 30 is defined by forming two flat surfaces on the mounting shaft portion 28. The main valve 91 of the extension-side damping force generating mechanism 41 does not include a fixed orifice, which allows the passage 37 and the lower cylinder chamber 2B to always communicate with each other.

The cap 101 mentioned above, a passage member 102, a retainer 103, a spacer 104, a compression-side ultra low speed valve 105, and a valve body 106 are provided on a side of the extension-side first damping force generating mechanism 41, which is opposite to the piston 18 with respect to the main valve 91, and are arranged in the stated order from a side closer to the main valve 91. The compression-side ultra low speed valve 105 includes a plurality of discs. The cap 101 is formed in a substantially bottomed cylindrical shape being open on a side opposite to the piston 18. A space between an inner peripheral surface of the cap 101 and the valve body 106 is sealed with a sealing member 107 having an annular shape.

An extension-side ultra low speed valve 108, a plurality of spacers 109, a retainer 110, and an annular member 111 are provided on a side of the extension-side first damping force generating mechanism 41, which is opposite to the compression-side ultra low speed valve 105 through the valve body 106, and are arranged in the stated order from the side closer to the ultra low speed valve 105. The extension-side ultra low speed valve 108 includes a plurality of discs. Components located between the annular members 67 and 111, through which the mounting shaft 28 passes, are fixed with a nut 112 fastened onto the threaded portion 31 of the mounting shaft 28.

The valve body 106 has a clamp portion 134 with a shaft hole 131. The valve body 106 has a seat portion 136 having an annular shape. The seat portion 136 is formed on a radially outer region of an end surface of the valve body 106, which is on a side closer to the piston 18. An outer peripheral edge portion of the compression-side ultra low speed valve 105 can be seated on and separated from the seat portion 136. The valve body 106 has a seat portion 135 having an annular shape. The seat portion 135 is formed on the end surface of the valve body 106, which is on the side closer to the piston 18, and is located between the clamp portion 134 and the seat portion 136. An intermediate portion of the compression-side ultra low speed valve 105 can be seated on and separated from the seat portion 135. Meanwhile, the valve body 106 has a seat portion 139 having an annular shape. The seat portion 139 is formed on an end surface of the valve body 106, which is on a side opposite to the piston 18. An outer peripheral edge portion of the extension-side ultra low speed valve 108 can be seated on and separated from the seat portion 139.

The valve body 106 has passages 141 and 143 that pass through the valve body 106 in an axial direction (vertical direction) thereof. A plurality of the passages 141 are located on a radially inner side, and a plurality of the passages 143 are located on a radially outer side. Each of the passages 141 has an open end (lower end) on a side closer to the extension-side ultra low speed valve 108, which is located on a radially inner side of the seat portion 139, and an open end (upper end) on a side closer to the compression-side ultra low speed valve 105, which is located on a radially inner side of the seat portion 135. Meanwhile, each of the passages 143 has an open end (lower end) on the side closer to the extension-side ultra low speed valve 108, which is exposed to the lower cylinder chamber 2B, and an open end (upper end) on the side closer to the compression-side ultra low speed valve 105, which is located between the seat portions 135 and 136.

A cap chamber 146 is defined between the cap 101 and the valve body 106. The cap chamber 146 always communicates with the upper cylinder chamber 2A via a passage 153 defined in the passage member 102, the passage 30 defined in the mounting shaft portion 28, the annular passage 46 defined on the inner periphery side of the piston 18, the orifice 88 of the retainer 82, and the extension-side passage 37 defined in the piston 18. Further, the cap chamber 146 always communicates with the passages 141 in the valve body 106 via a passage 161 defined in the compression-side ultra low speed valve 105. The ultra low speed valve 105 functions as a check valve that allows a flow of the oil liquid from the lower cylinder chamber 2B to the cap chamber 146.

As illustrated in FIG. 1, a base valve 25 is provided on a bottom of the cylinder 2. The base valve 25 includes a valve body 191, an extension-side disc valve 192, a compression-side disc valve 193 (second low speed valve), and a mount pin 194. The valve body 191 separates the lower cylinder chamber 2B and the reservoir 6 from each other. The extension-side disc valve 192 is provided on a side (lower end side) of the valve body 191, which is closer to the reservoir 6. The compression-side disc valve 193 is provided on a side (upper end side) of the valve body 191, which is closer to the lower cylinder chamber 2B. The mount pin 194 mounts the extension-side disc valve 192 and the compression-side disc valve 193, which are suction valves, to the valve body 191.

The valve body 191 has passages 195 and 196 passing through the valve body 191 in an axial direction (vertical direction) thereof. A plurality of the passages 195 are located on a radially inner side, and a plurality of the passages 196 are located on a radially outer side. The extension-side disc valve 192 functions as a check valve configured to allow a flow of the oil liquid from the lower cylinder chamber 2B to the reservoir 6 via the plurality of passages 195. The extension-side disc valve 192 has an orifice 198 configured to allow the lower cylinder chamber 2B and the reservoir 6 to always communicate with each other. Meanwhile, the compression-side disc valve 193 functions as a suction valve configured to allow a flow of the oil liquid from the reservoir 6 to the lower cylinder chamber 2B via a plurality of the passages 196. The valve body 191 has a cutout 197 configured to allow a space below a lower end of the valve body 191 and the reservoir 6 to always communicate with each other.

As illustrated in FIG. 1, a separator tube 10 is mounted on an outer periphery of the inner cylinder 3 with a pair of sealing members 9, 9 interposed therebetween. An annular oil path 11 is defined between the separator tube 10 and the inner cylinder 3. The annular oil path 11 communicates with the upper cylinder chamber 2A via a plurality of passages 12 formed through an upper end part of a side wall of the inner cylinder 3. A connection port 13 (opening) having a cylindrical shape is formed through a lower end part of a side wall of the separator tube 10. The connection port 13 projects laterally, and has an open distal end. A mounting hole 14 is formed through a side wall of the outer cylinder 4 so as to be opposed to the connection port 13. The mounting hole 14 is located coaxially with the connection port 13, and has an inner diameter larger than an outer diameter of the connection port 13. A case 15 having a substantially cylindrical shape is provided on the side wall of the outer cylinder 4 so as to surround the mounting hole 14. The damping force adjustment mechanism 121 is accommodated in the case 15.

Figure 3:
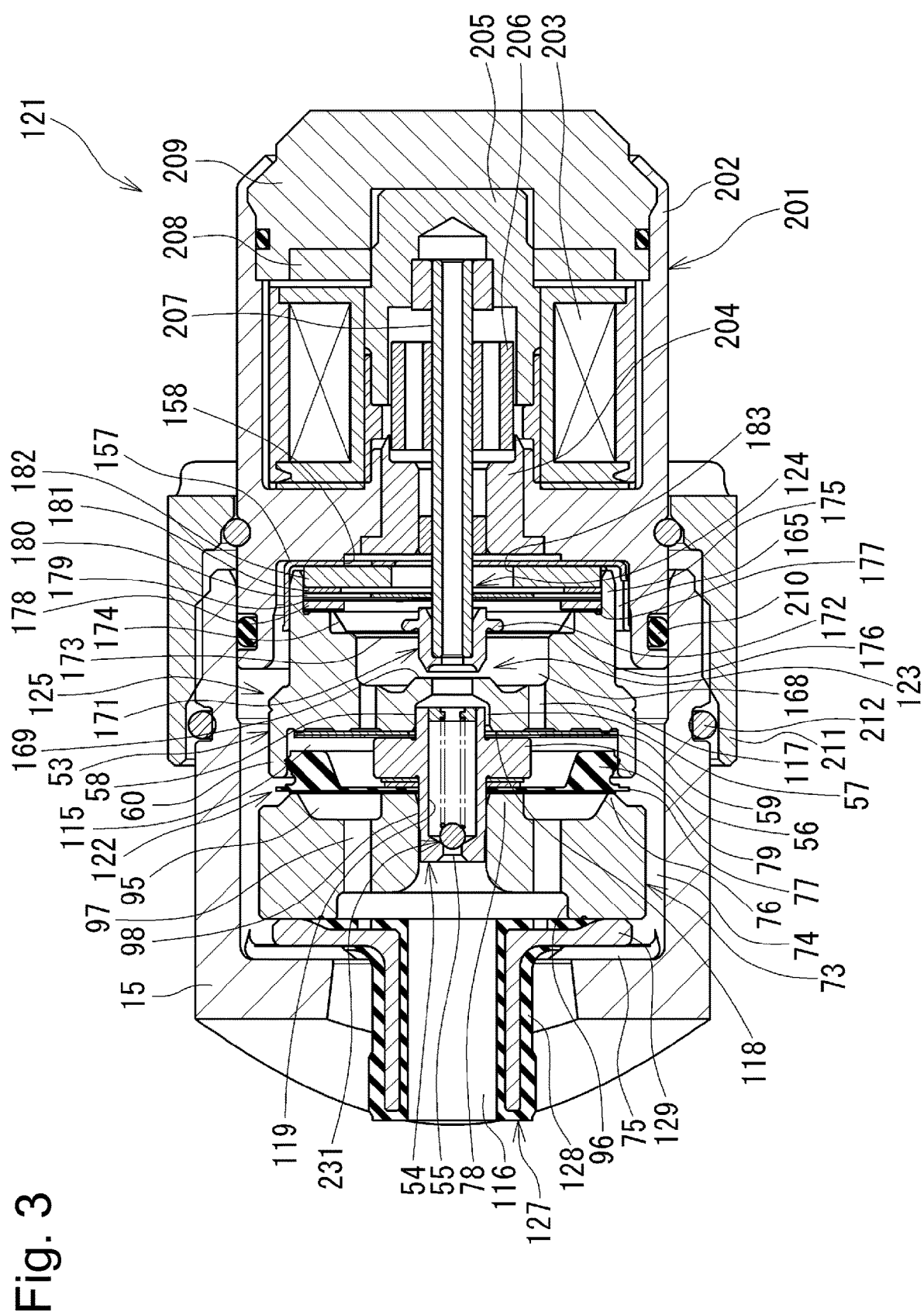
FIG. 3 is an enlarged view of a damping force adjustment mechanism illustrated in FIG. 1.

With reference to FIG. 3, the damping force adjustment mechanism 121 includes a valve block 125 and a solenoid block 201. A back-pressure main valve 122, a pilot valve 123 (control valve) configured to control a valve opening pressure of the main valve 122, and a fail-safe valve 124 provided on a downstream side of the pilot valve 123 are assembled and integrated to form the valve block 125. The solenoid block 201 includes a mechanism configured to actuate the pilot valve 123, which is incorporated therein.

A joint member 127 is inserted into the case 15. The joint member 127 includes a tubular portion 128 and a flange portion 129 (abutment surface). The tubular portion 128 has a cylindrical shape, and has one distal end inserted into the connection port 13 (opening). The flange portion 129 is formed at another end of the tubular portion 128. The joint member 127 is covered with a sealing member. As a result, an abutment portion between the connection port 13 and a main body 73 is sealed. A bottom portion (inward flange portion) of the case 15 has a plurality of grooves configured to allow communication between a flow path 74 on an outer side of the valve block 125, specifically, the damping force adjustment mechanism 121, and the reservoir 6. The formation of the grooves defines a plurality of passages 75 configured to allow communication between the flow path 74 and the reservoir 6.

The valve block 125 includes the main body 73 having an annular shape, a pilot body 53 having an annular shape, and a pilot pin 54. The pilot pin 54 couples the main body 73 and the pilot body 53 to each other. One end surface (left end surface in FIG. 3) of the main body 73 is brought into abutment against the flange portion 129 (abutment surface) of the joint member 127. The main body 73 has a seat portion 76 having an annular shape formed on an outer peripheral end region of another end surface (right end surface in FIG. 3) thereof. An outer peripheral edge portion of a main disc valve 77 included in the main valve 122 is seated on the seat portion 76.

An inner peripheral edge portion of the main disc valve 77 is clamped between the pilot pin 54 and a clamp portion 78 of the main body 73. A packing 79 having an annular shape is rigidly fixed to an outer peripheral edge portion of a back surface (right-side surface in FIG. 3) of the main disc valve 77. The clamping portion 78 having an annular shape is formed on an inner peripheral edge portion of the main body 73. The main body 73 has an annular recessed portion formed on another end surface thereof. When the main disc valve 77 is seated on the seat portion 76, an annular passage 95 is defined. Meanwhile, the main body 73 has a recessed portion 96 formed in the one end surface. Further, the main body 73 has a plurality of passages 97 (main flow paths) that allows communication between the recessed portion 96 on the one end side and the annular passage 95 on another end side.

The pilot pin 54 (introduction orifice defining member) is formed in a bottomed cylindrical shape, and has an introduction orifice 55 formed in its bottom portion. The pilot pin 54 has a large-diameter portion 56 at an intermediate portion in an axial direction thereof. The large-diameter portion 56 is used to clamp the main disc valve 77. One end (left end in FIG. 3) of the pilot pin 54 is press-fitted into a shaft hole 98 of the main body 73. Another end (right end in FIG. 3) of the pilot pin 54 is fitted into a shaft hole 58 of the pilot body 53. An outer peripheral surface of the another end of the pilot pin 54 has a plurality of grooves extending in an axial direction (horizontal direction in FIG. 3) thereof. When the another end of the pilot pin 54 is press-fitted into the shaft hole 58 of the pilot body 53, a plurality of passages 57 are defined between the another end of the pilot pin 54 and the pilot body 53.

The pilot body 53 has a substantially bottomed cylindrical shape with open another end. A flexible disc 59 is provided on one end surface of the pilot body 53 in such a manner as to be clamped between the one end surface of the pilot body 53 and the large-diameter portion 56 of the pilot pin 54. The pilot body 53 has a cylindrical portion 60 formed on an outer peripheral edge portion of its one end, and the cylindrical portion 60 is coaxial with the pilot body 53. The packing 79 of the main valve 122 is slidably brought into abutment against an inner peripheral surface of the cylindrical portion 60. The abutment of the packing 79 against the cylindrical portion 60 defines a pilot chamber 115 on a back surface side of the main disc valve 77.

The pilot chamber 115 exerts an internal pressure on the main disc valve 77 (main valve 122) in a valve-closing direction. The main disc valve 77 is separated from the seat portion 76 under a pressure of the oil liquid that has been introduced from the annular oil path 11 (see FIG. 1) via a flow path 116 defined inside the joint member 127, the recessed portion 96 of the main body 73, and the plurality of passages 97. In this manner, the main disc valve 77 is opened, and brings the passages 97 in the main body 73 into the flow path 74 on the outer side of the valve block 125.

The pilot body 53 has a plurality of passages 117 passing through its bottom portion in the axial direction. The pilot body 53 has a seat portion (reference symbol is omitted) having an annular shape on one end surface of its bottom portion. The flexible disc 59 is seated on the seat portion. When the flexible disc 59 is seated on the seat portion, an annular passage is defined between the flexible disc 59 and the one end surface of the bottom portion. The annular passage communicates with one end (left end in FIG. 3) of each of the passages 117. When being warped under the internal pressure of the pilot chamber 115, the flexible disc 59 provides volume elasticity to the pilot chamber 115.

The flexible disc 59 is formed by laminating a plurality of discs. One of the plurality of discs that is in abutment against the large-diameter portion 56 of the pilot pin 54 has a cutout 118 that communicates with the passages 57 defined between the pilot body 53 and the pilot pin 54. The oil liquid in the annular oil path 11 is introduced into the damping force adjustment mechanism 121 via the connection port 13 (opening) and the flow path 116 inside the joint member 127. Further, the oil liquid is introduced into the pilot chamber 115 via an introduction passage, that is, the introduction orifice 55, a shaft hole 119 in the pilot pin 54, the passages 57, and the cutout 118.

A valve chamber 168 is defined inside the pilot body 53. The pilot body 53 has a seat portion 169 (pilot valve) formed on its bottom portion so that the seat portion 169 is located around an outer peripheral edge of another end of the shaft hole 58. A valve body 171 (pilot valve) provided in the valve chamber 168 is seated on and separated from the seat portion 169. The valve body 171 is formed in a substantially cylindrical shape, and has one tapered end, which is seated on and separated from the seat portion 169. A spring receiving portion 172 having an outward flange shape is formed on another end side of the valve body 171.

The valve body 171 is provided so as to be opposed to the seat portion 169, and is elastically supported by a pilot spring 173, a fail-safe spring 174, and a fail-safe disc 179 so as to be movable in an axial direction (horizontal direction in FIG. 3) thereof. The pilot body 53 has a cylindrical portion 175 at another end thereof. The cylindrical portion 175 has step portions 176 and 177 so as to have an inner diameter that increases toward an opening in a stepwise manner. An outer peripheral edge portion of the pilot spring 173 is supported by the step portion 176. The fail-safe spring 174, a retainer 178, the fail-safe disc 179, a retainer 180, a spacer 181, and a washer 182 are stacked on one another and inserted into the cylindrical portion 175.

A cylindrical portion of a cap 157 having a substantially bottomed cylindrical shape is fitted over an outer periphery of the cylindrical portion 175 of the pilot body 53. The cap 157 has a bottom portion that is held between the washer 182 and a solenoid case 202. A passage 165 that allows the valve chamber 168 and the flow path 74 on the outer side of the valve block 125 to communicate with each other is defined between the cap 157 and the cylindrical portion 175 of the pilot body 53.

A coil 203, cores 204 and 205, a plunger 206, and a hollow operating rod 207 coupled to the plunger 206 are assembled and integrated inside the solenoid case 202 to form the solenoid block 201. A spacer 208 and a cover 209 are inserted into another end of the solenoid case 202. The components inside the solenoid case 202 are fixed by caulking another end of the solenoid case 202. When the coil 203 is energized via a lead wire (not shown), the plunger 206 generates a thrust force in the axial direction in accordance with a current value.

One end of the solenoid case 202 is inserted into an opening at another end of the case 15. A space between the solenoid case 202 and the case 15 is sealed with a sealing member 210. One end of the operating rod 207 projects into the valve chamber 168. The valve body 171 is mounted to one end of the operating rod 207. When a nut 211 is tightened to compress a retaining ring 212 mounted in an annular groove, the solenoid case 202 is fixed to the case 15. As a result of fixing, the valve block 125 and the solenoid block 201 are coupled together.

When the coil 203 is not energized, the valve body 171 is urged in a seat-separating direction (rightward in FIG. 3) for the valve body 171 by a spring force of the fail-safe spring 174 to thereby bring the spring receiving portion 172 into abutment against (seating the spring receiving portion 172 on) the fail-safe disc 179. At this time, the pilot spring 173 is separated from the step portion 176. Meanwhile, when the coil 203 is energized, the operating rod 207 is urged in a seating direction (leftward in FIG. 3) for the valve body 171 to thereby bring the pilot spring 173 into abutment against the step portion 176. The valve body 171 is seated on the seat portion 169 of the pilot body 53 against spring forces of the pilot spring 173 and the fail-safe spring 174. Then, when a value of the current for energizing the coil 203 is changed, a valve-opening pressure on the valve body 171 is controlled.

Figure 4:
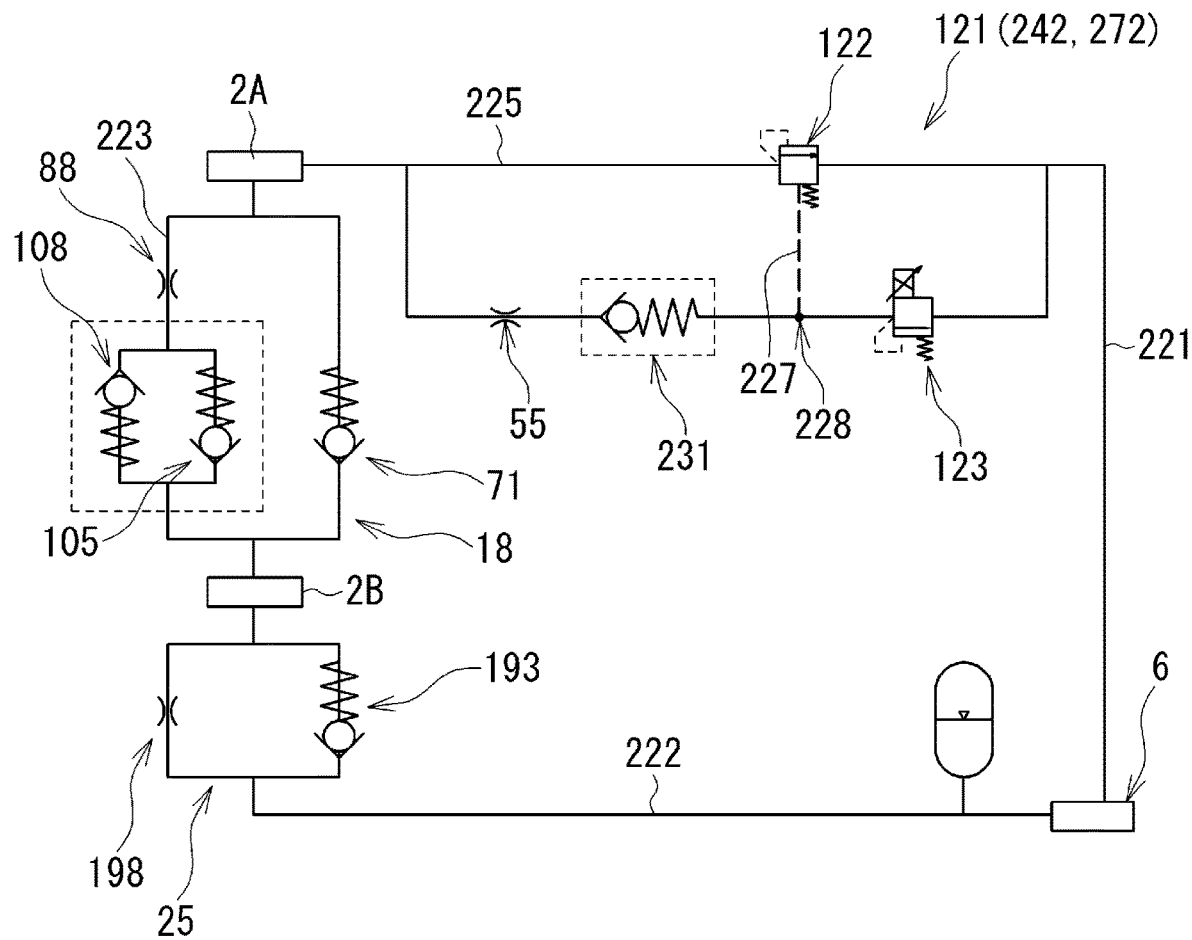
FIG. 4 is a conceptual diagram of a hydraulic circuit in the damping force adjustable shock absorber according to the first embodiment.

For convenience, a flow of the oil liquid in the damping force adjustment mechanism 121 is roughly classified into a main flow and a pilot flow. With reference to FIG. 3 and FIG. 4, the main flow is a flow of the oil liquid passing through a main passage 225. The main passage 225 brings the recessed portion 96 formed in the one end of the main body 73 and a downstream side of the main valve 122 into communication with each other. The main passage 225 includes the plurality of passages 97 of the main body 73 and the annular passage 95. The main passage 225 allows the oil liquid, which has been introduced from the connection port 13 (see FIG. 1) into the annular passage 95 via the plurality of passages 97, to be discharged via the main valve 122 into the flow path 74 communicating with the reservoir 6.

Meanwhile, the pilot flow is a flow of the oil liquid passing through a pilot passage 226 including the introduction passage described above. When the pilot valve 123 is opened and a damping force has a soft characteristic, the pilot passage 226 allows the oil liquid, which has been introduced into the valve chamber 168 via the introduction orifice 55 of the pilot pin 54 (introduction orifice defining member), to be discharged via a shaft hole 183 of the washer 182 and the passage 165 into the flow path 74 communicating with the reservoir 6. An ultra low speed valve 231 (low speed valve mechanism) is provided in the pilot passage 226. The ultra low speed valve 231 is opened when a piston speed is lower than a piston speed at which the main valve 122 is opened. In the first embodiment, when the damping force has a soft characteristic, specifically, a value of the current for energizing the coil 203 is small, the spring force of the pilot spring 173 and the thrust force of the plunger 206 are balanced, separating the pilot valve 123 from the seat portion 169.

A hydraulic circuit of the damping force adjustable shock absorber 1 according to the first embodiment is described mainly with reference to FIG. 4.

The piston 18 includes a passage 220 that connects the upper cylinder chamber 2A and the lower cylinder chamber 2B to each other. The passage 220 includes the compression-side passage 39. The intake valve 71 that allows the flow of the oil liquid from the lower cylinder chamber 2B to the upper cylinder chamber 2A is provided in the passage 220. Further, the piston 18 includes a third passage 223 located in parallel to the intake valve 71.

The extension-side ultra low speed valve 108 that allows the flow of the oil liquid from the upper cylinder chamber 2A to the lower cylinder chamber 2B is provided in the third passage 223. The ultra low speed valve 108 is opened at a pressure lower than a pressure at which the intake valve 71 is opened. The compression-side ultra low speed valve 105 is provided in the third passage 223 so as to be located in parallel to the extension-side ultra low speed valve 108. Further, the orifice 88 is located in the third passage 223 so as to be closer to the upper cylinder chamber 2A with respect to the ultra low speed valves 108 and 105.

The third passage 223 includes an extension-side path and a compression-side path. The extension-side path passes through the extension-side passage 37 of the piston 18, the orifice 88 of the retainer 82, the annular passage 46 defined on the inner periphery side of the piston 18, the passage 30 defined in the mounting shaft portion 28, the passage 153 defined in the passage member 102, the cap chamber 146, the passage 161 defined in the compression-side ultra low speed valve 105, the passages 141 of the valve body 106, and the extension-side ultra low speed valve 108. The compression-side path passes through the passages 143 of the valve body 106, the compression-side ultra low valve 105, the cap chamber 146, the passage 153 defined in the passage member 102, the passage 30 defined in the mounting shaft portion 28, the annular passage 46 defined on the inner periphery side of the piston 18, the orifice 88 of the retainer 82, and the extension-side passage 37 defined in the piston 18.

The lower cylinder chamber 2B and the reservoir 6 are connected to each other through a second passage 222. The second passage 222 includes the passages 195 and 196 defined in the base valve 25 and the cutout 197. The compression-side disc valve 193 is provided in the second passage 222 (base valve 25). The orifice 198 is provided in the second passage 222 (extension-side disc valve 192) so as to be arranged in parallel to the compression-side disc valve 193.

The upper cylinder chamber 2A and the reservoir 6 are connected to each other through a first passage 221. The first passage 221 includes the main passage 225, the pilot passage 226, and a communication path 227, which are defined in the damping force adjustment mechanism 121. The communication path 227 allows communication between the main valve 122 and the pilot passage 226. The communication path 227 includes the valve chamber 168 of the pilot body 53, the passages 117, the flexible disc 59, and the pilot chamber 115.

The main valve 122 of the damping force adjustment mechanism 121 is provided in the main passage 225. The introduction orifice 55 is provided in the introduction passage 226. The introduction orifice 55 is arranged on a side closer to the upper cylinder chamber 2A with respect to a connecting portion 228 between the pilot passage 226 and the communication path 227. The pilot valve 123 is arranged on a side closer to the reservoir 6 with respect to the connecting portion 228. Further, the ultra low speed valve 231 that allows the flow of the oil liquid from the upper cylinder chamber 2A to the reservoir 6 is provided in the pilot passage 226. The ultra low speed valve 231 is arranged between the introduction orifice 55 and the connecting portion 228.

A piston speed at which the extension-side ultra low speed valve 108 included in the piston 18 is opened is lower than a piston speed at which the ultra low speed valve 231 provided in the pilot passage 226 is opened. Further, a piston speed at which the compression-side ultra low speed valve 105 provided in the piston 18 is opened is lower than a piston speed at which the ultra low speed valve 231 provided in the pilot passage 226 is opened. In addition, a piston speed at which the compression-side ultra low speed valve 105 is opened is lower than a piston speed at which the intake valve 71 provided in the piston 18 is opened.

Figure 5:
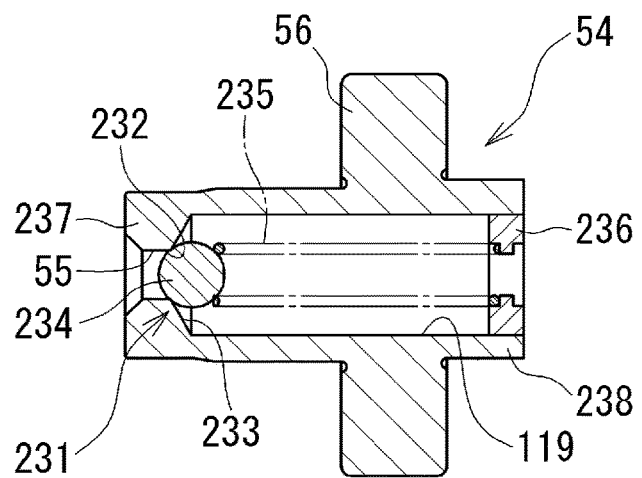
FIG. 5 is an explanatory sectional view for illustrating a pilot pin, in which an ultra low speed valve (low speed valve mechanism) is provided, in the first embodiment.

As illustrated in FIG. 5, the ultra low speed valve 231 (low speed valve mechanism) is provided in a tubular portion 238 of the pilot pin 54 (introduction orifice defining member). The pilot pin 54 includes the introduction orifice 55 formed in a bottom portion 237. The main valve 122 and the pilot chamber 115 are located on an outer periphery side of the tubular portion 238. Meanwhile, the ultra low speed valve 231 is located on an inner periphery side of the tubular portion 238, specifically, in the shaft hole 119 of the pilot pin 54. The ultra low speed valve 231 includes a seat portion 232 (valve seat) defined between the introduction orifice 55 and the shaft hole 119. In other words, the introduction orifice 55 is continuous with the shaft hole 119 via the seat portion 232. The seat portion 232 is defined at a circular edge portion between a tapered surface 233 inclining from the shaft hole 119 toward the introduction orifice 55 and the introduction orifice 55.

The ultra low speed valve 231 includes a valve body 234 that can be seated on and separated from the seat portion 232. The valve body 234 is formed of a spherical body having a diameter that is larger than an inner diameter of the introduction orifice 55 and smaller than an inner diameter of the shaft hole 119. The valve body 234 is pressed against the seat portion 232 by a valve spring 235 (helical compression spring) accommodated in the shaft hole 119. An end of the valve spring 235, which is on a side opposite to the valve body 234, is received by a spring receiving member 236 provided in the shaft hole 119. The spring receiving member 236 is press-fitted into an opening of the shaft hole 119, which is on a side opposite to the introduction orifice 55.

Next, actions in the first embodiment are described.
(Hard Mode)

When the damping force adjustable shock absorber operates in a hard mode in which a damping force having a hard characteristic is generated and the piston speed falls within a friction region in which the piston speed ranges from 0 to 0.002 m/s, a damping force (axial force) is generated with a friction force at a sliding portion. When the piston speed causes an increase in pressure to a valve-opening pressure for the compression-side ultra low speed valve 105 of the piston 18 and the ultra low speed valve 105 is opened, a damping force having a valve characteristic achieved by the ultra low speed valve 105 is generated in an initial period corresponding to an ultra low speed range. After that, a damping force having an orifice characteristic is generated mainly by the orifice 88 of the piston 18 in a very low speed range until the pilot valve 123 (control valve) of the damping force adjustment mechanism 121 is opened. The damping force of the ultra low speed valve 105 when the piston speed falls within the very low speed range has a saturation characteristic. Further, when the piston speed falls within the very low speed range, the pilot valve 123 of the damping force adjustment mechanism 121 is in a valve-closed state.

In this embodiment, the pressure of the ultra low speed valve 105 reaches the valve-opening pressure and the ultra low speed valve 105 is opened when the piston speed reaches 0.002 m/s. However, a mechanism may have an increasing flow path area such as a gradually enlarged orifice.

Further, in this embodiment, the ultra low speed valve 105 is opened when the piston speed reaches 0.002 m/s. However, the ultra low speed valve 105 is opened when the piston speed reaches 0.001 m/s or 0.005 m/s depending on tuning. In short, it means that the ultra low speed valve 105 is opened when the piston speed falls within a piston speed range lower than a low speed range.

When the piston speed falls within a low speed range starting from an opening point of the pilot passage 226 to valve opening of the main valve 122 of the damping force adjustment mechanism 121, the pilot valve 123 and the ultra low speed valve 231 are opened. The damping force is generated mainly by the introduction orifice 55 of the damping force adjustment mechanism 121. The damping force generated by the ultra low speed valve 231 when the piston speed falls within the low speed range has a saturation characteristic. Then, when the piston speed falls within an intermediate speed range after the main valve 122 of the damping force adjustment mechanism 121 is opened, a damping force having a valve characteristic achieved by the main valve 122 is generated.

(Soft Mode)

Figure 6:
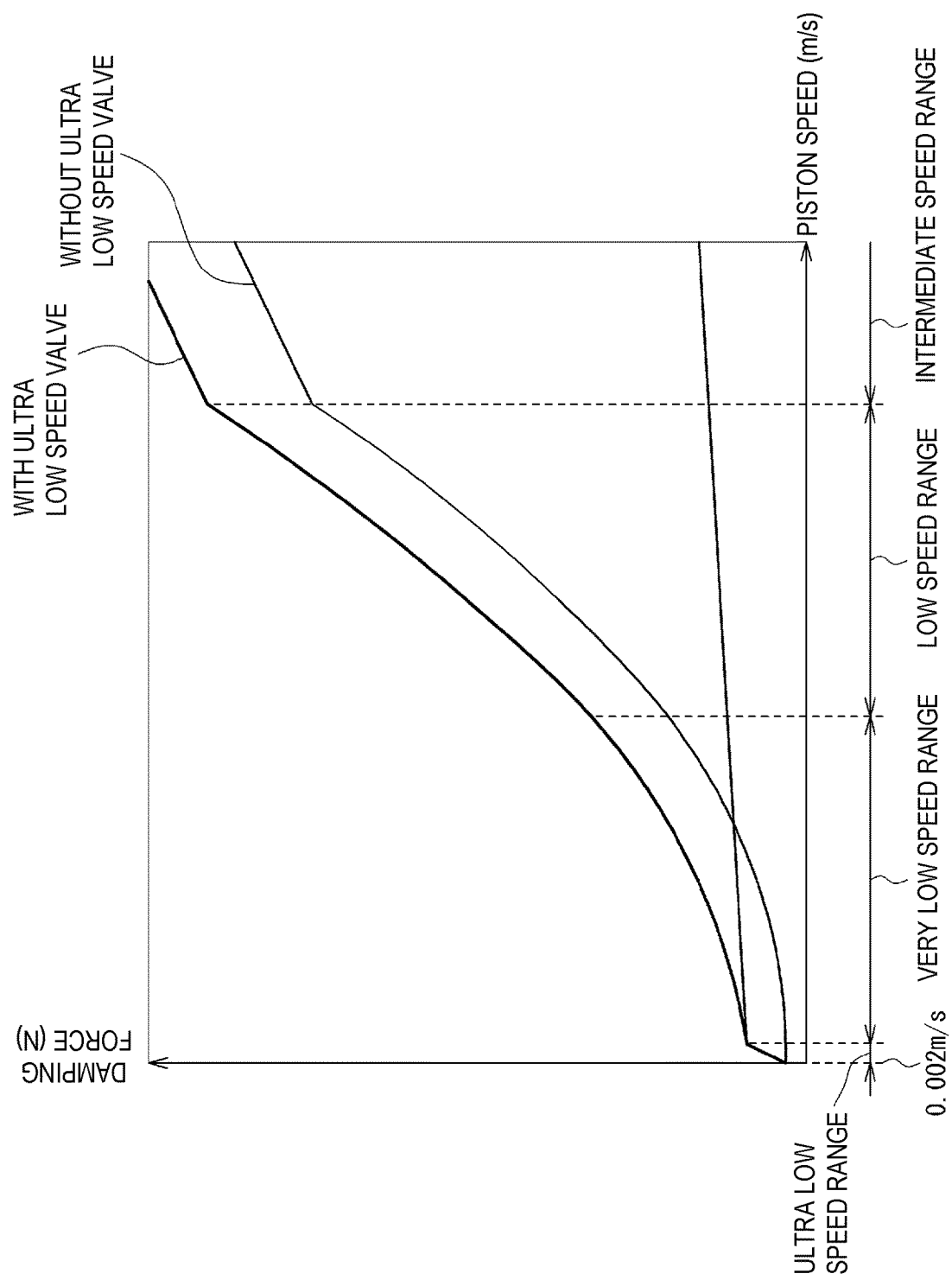
FIG. 6 is a graph for showing damping force characteristics when a piston of the damping force adjustable shock absorber according to the first embodiment performs a compression stroke.

FIG. 6 is a graph for showing damping force characteristics when the damping force adjustable shock absorber 1 according to the first embodiment operates in a soft mode and the piston is performing a compression stroke.

When the damping force adjustable shock absorber 1 operates in the soft mode in which a damping force having a soft characteristic is generated and the piston speed falls within the friction region ranging from 0 to 0.002 m/s, a damping force (axial force) is generated by the fiction force at the sliding portion. When the piston speed falls within an ultra low speed range from 0.002 m/s to a speed at which the ultra low speed valve 231 (low speed valve mechanism) of the damping force adjustment mechanism 121 is opened, that is, the valve body 234 is separated from the seat portion 232 against an urging force of the valve spring 235, a differential pressure is generated between the upper cylinder chamber 2A side and the lower cylinder chamber 2B side of the compression-side ultra low speed valve 105 due to expansion of the oil liquid in the upper cylinder chamber 2A. As a result, the compression-side ultra low speed valve 105 is opened. Then, when the piston speed falls within the ultra low speed range, the damping force having the valve characteristic achieved by the ultra low speed valve 105 is generated. When the piston speed falls within the ultra low speed range, the pilot valve 123 of the damping force adjustment mechanism 121 is in a valve-opened state.

When the piston speed falls within a very low speed range from valve opening of the ultra low speed valve 231 of the damping force adjustment mechanism 121 to valve opening of the main valve 122 of the damping force adjustment mechanism 121, the intake valve 71 (first low speed valve) is first opened. After that, a damping force having a valve characteristic achieved by the ultra low speed valve 231 of the damping force adjustment mechanism 121 is generated. Then, when an orifice differential pressure at the orifice 88 of the piston 18 increases to generate a pressure difference at the introduction orifice 55 of the damping force adjustment mechanism 121, the main valve 122 of the damping force adjustment mechanism 121 is opened. When the piston speed falls within a low speed range after the main valve 122 of the damping force adjustment mechanism 121 is opened, a damping force having a valve characteristic achieved by the main valve 122 is generated. When the piston speed falls within an intermediate speed range, the intake valve 71 of the piston 18 is opened. As a result, a damping force having a valve characteristic achieved by the intake valve 71 is generated.

Meanwhile, when the damping force adjustable shock absorber 1 operates in the soft mode, the piston is performing an extension stroke, and the piston falls within the ultra low speed range, the oil liquid in the upper cylinder chamber 2A is compressed to generate a differential pressure between the upper cylinder chamber 2A side and the lower cylinder chamber 2B side of the extension-side ultra low speed valve 108. As a result, the ultra low speed valve 108 is opened. Thus, when the piston is performing the extension stroke and the piston speed falls within the ultra low speed range, a damping force having a valve characteristic achieved by the ultra low speed valve 108 is generated. Further, when the orifice differential pressure at the orifice 88 of the piston 18 increases to open the ultra low speed valve 231 of the damping force adjustment mechanism 121, the damping force having the valve characteristic achieved by the ultra low speed valve 231 is generated. After that, when the pressure difference at the introduction orifice 55 of the damping force adjustment mechanism 121 increases, the main valve 122 of the damping force adjustment mechanism 121 is opened. As a result, the damping force having the valve characteristic achieved by the main valve 122 is generated.

Here, an ultra low speed valve is provided in a piston unit of a damping force adjustment mechanism of a damping force adjustable shock absorber described in Patent Literature 2, in other words, the hydraulic circuit illustrated in FIG. 4 does not include the ultra low speed valve 231 (low speed valve mechanism), that is, the ultra low speed valve 231 is eliminated from the damping force adjustment mechanism 121 of the damping force adjustable shock absorber 1 according to the first embodiment. Then, when the damping force adjustable shock absorber 1 operates in the soft mode in which the pilot valve 123 (control valve) of the damping force adjustment mechanism 121 is opened, the compression-side ultra low speed valve 105 of the piston 18 is brought into communication with the reservoir 6 via the first passage 221 including the introduction orifice 55 of the pilot passage 226 on the upper cylinder chamber 2A side and is brought into communication with the reservoir 6 via the second passage 222 including the orifice 198 of the base valve 25 on the lower cylinder chamber 2B side.

Thus, when the piston speed falls within the ultra low speed range, the pressure on the upper cylinder chamber 2A side of the ultra low speed valve 105 is substantially the same as a pressure in the reservoir 6. Meanwhile, when the piston speed falls within the ultra low speed range, the pressure on the lower cylinder chamber 2B side of the ultra low speed valve 105 is substantially the same as the pressure in the reservoir 6. That is, when the piston speed falls within the ultra low speed range, the pressure on the upper cylinder chamber 2A side and the pressure on the lower cylinder chamber 2B side of the ultra low speed valve 105 are substantially the same. The same pressure prevents generation of a differential pressure that is sufficient to open the ultra low speed valve 105 between the upper cylinder chamber 2A side and the lower cylinder chamber 2B side of the compression-side ultra low speed valve 105. As a result, when the piston speed falls within the ultra low speed range, the damping force cannot be adjusted.

Meanwhile, in the first embodiment, the ultra low speed valve 231 (low speed valve mechanism) is provided in the pilot passage 226 that brings a downstream side of the introduction orifice 55, the pilot chamber 115, and the downstream side of the main valve 122 into communication with each other. The ultra low speed valve 231 (low speed valve mechanism) is opened when the piston speed reaches a piston speed (0.002 m/s) lower than a piston speed at which the main valve 122 is opened.

According to the first embodiment, when the damping force adjustable shock absorber operates in the soft mode, the piston is performing the extension stroke, and the piston speed falls within the ultra low speed range, the communication between the upper cylinder chamber 2A and the reservoir 6 is interrupted by the ultra low speed valve 231 (low speed valve mechanism) provided in the pilot passage 226. The interruption of the communication compresses the oil liquid in the upper cylinder chamber 2A when the piston is performing the extension stroke and the piston speed falls within the ultra low speed range. Thus, a differential pressure is generated between the upper cylinder chamber 2A side and the lower cylinder chamber 2B side of the extension-side ultra low speed valve 108. As a result, when the piston speed falls within the ultra low speed range, the extension-side ultra low speed valve 108 is opened. Thus, the damping force having the valve characteristic achieved by the ultra low speed valve 108 can be generated.

Further, when the damping force adjustable shock absorber operates in the soft mode, the piston is performing the compression stroke, and the piston speed falls within the ultra low speed range, the communication between the upper cylinder chamber 2A and the reservoir 6 is interrupted by the ultra low speed valve 231 (low speed valve mechanism) provided in the pilot passage 226. The interruption of the communication enables expansion of the oil liquid in the upper cylinder chamber 2A when the piston is performing the compression stroke and the piston speed falls within the ultra low speed range. Thus, the differential pressure is generated between the upper cylinder chamber 2A side and the lower cylinder chamber 2B side of the compression-side ultra low speed valve 105. As a result, when the piston speed falls within the ultra low speed range, the compression-side ultra low speed valve 105 is opened. Thus, the damping force having the valve characteristic achieved by the ultra low speed valve 105 can be generated.

Still further, in the first embodiment, the ultra low speed valve 231 (low speed valve mechanism) is provided on the inner periphery side (shaft hole 119) of the tubular portion 238 of the pilot pin 54 (introduction orifice defining member) having the bottom portion 237 with the introduction orifice 55. Thus, the ultra low speed valve 231 can be combined with the pilot pin 54 before the pilot pin 54 is combined with the damping force adjustment mechanism 121.

Thus, the same assembly steps as those in the related art are used except that a step of combining the ultra low speed valve 231 with the pilot pin 54 in advance is added. Thus, the ultra low speed valve 231 can easily be used in a related-art damping force adjustment mechanism (see, for example, Patent Literature 2).

Still further, in the first embodiment, a combination of a spring force of the valve spring 235 and a pressure-receiving area of the valve body 234 enables adjustment of the valve opening pressure for the ultra low speed valve 231 (low speed valve mechanism). This in turn increases a degree of freedom in design of damping force characteristics.

(Second Embodiment) Next, a second embodiment is described with reference to FIG. 7. Here, differences from the first embodiment are described. The same names and reference symbols are used for parts common to the first embodiment, and an overlapping description thereof is omitted.

In the first embodiment, the pilot pin 54 (introduction orifice defining member) having the bottom portion 237 with the introduction orifice 55 is provided. The ultra low speed valve 231 (low speed valve mechanism) is provided on the inner periphery side of the tubular portion 238 of the pilot pin 54, specifically, in the shaft hole 119 of the pilot pin 54. Further, in the first embodiment, the packing 79 of the main valve 122 is slidably brought into abutment against the inner peripheral surface of the cylindrical portion 60 of the pilot body 53 to thereby define the pilot chamber 115 (back-pressure chamber) on the back side of the main disc valve 77. That is, the main valve 122 of the damping force adjustment mechanism 121 in the first embodiment is a packing valve.

Meanwhile, a damping force adjustment mechanism 242 of a second embodiment includes a rigid main valve 243, and does not include a packing valve unlike the case of the damping force adjustment mechanism 121 of the first embodiment. The rigid main valve 243 includes an introduction orifice 55 and an ultra low speed valve 241 (low speed valve mechanism). That is, the rigid main valve 243 in the second embodiment functions as an introduction orifice defining member and a main valve.

Figure 7:
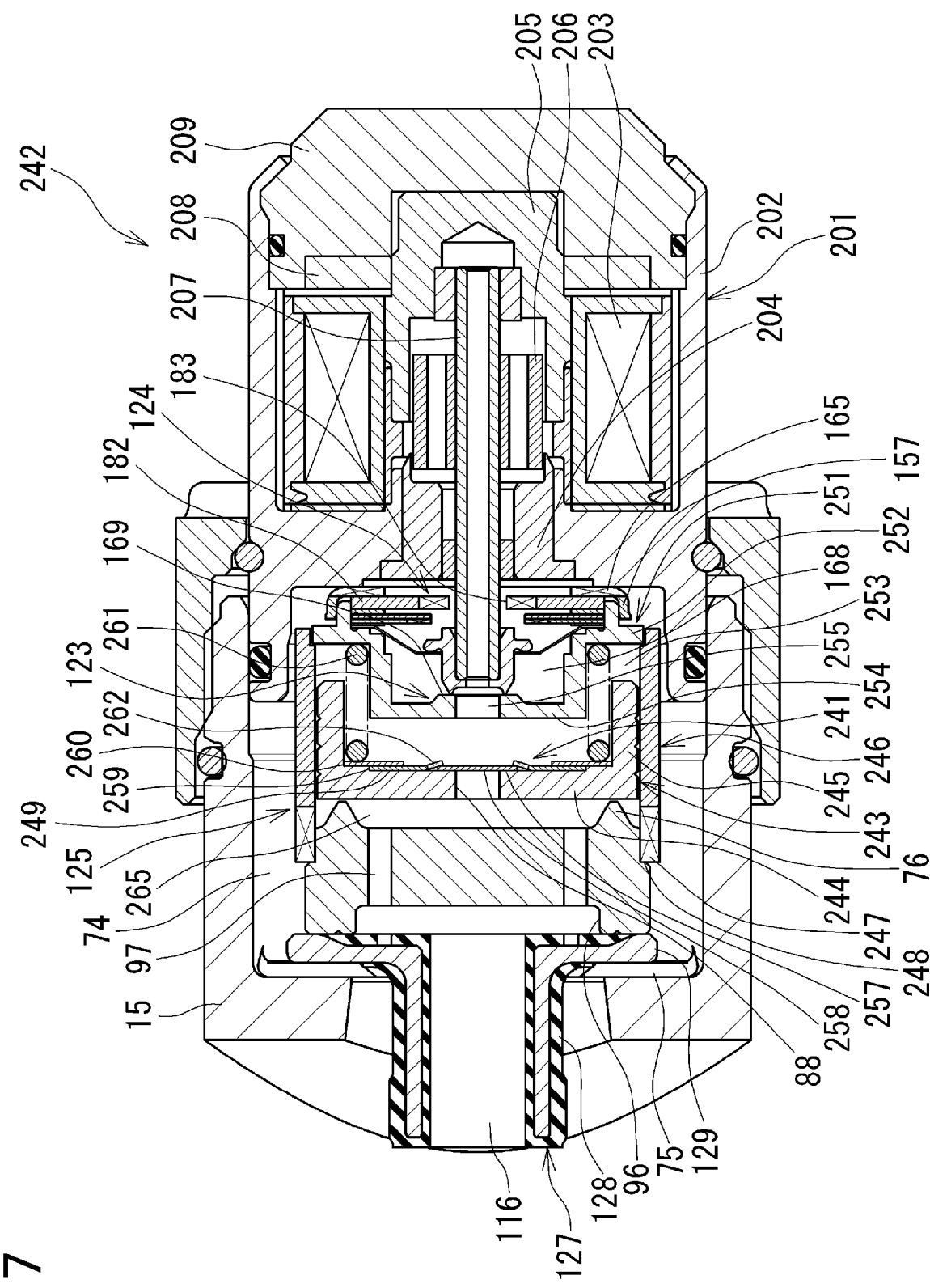
FIG. 7 is a sectional view of a damping force adjustment mechanism in a damping force adjustable shock absorber according to a second embodiment.

The rigid main valve 243 is formed in a bottomed cylindrical shape being open on a pilot body 251 side (right side in FIG. 7, opposite to the main body 73). The rigid main valve 243 has a bottom portion 244 with the introduction orifice 55. The bottom portion 244 of the rigid main valve 243 is brought into abutment against a seat portion 76 of a main body 73 so as to be seatable thereon and separable therefrom. The rigid main valve 243 (cylindrical portion 245) is slidably inserted into an inner periphery side of a sleeve 246 having a cylindrical shape. An end of the sleeve 246, which is on a side closer to the main valve 73 (left side in FIG. 7), is press-fitted onto a step portion 248 on an outer periphery side of the main valve 73. Further, the sleeve 246 has a cutout 247 formed in its end on a side closer to the main valve 73. The cutout 247 brings the main passage 225 (see FIG. 4) into communication with a flow path 74 on an outer side of a valve block 125.

The pilot body 251 is formed in a bottomed cylindrical shape being open on a fail-safe valve 124 side (right side in FIG. 7). The pilot body 251 has a flange portion 252 at an open end. The flange portion 252 is fixed to a step portion formed on an inner periphery side of an end portion of the sleeve 246, which is located on a side (right side in FIG. 7) opposite to the main valve 73. As a result, a pilot chamber 253 is defined by the sleeve 246, the rigid main valve 243, and the pilot body 251 on an inner periphery side of the sleeve 246. A valve chamber 168 is defined inside the pilot body 251. A bottom portion 254 of the pilot body 251 has a seat portion 169 (pilot valve 123) having an annular shape. The seat portion 169 is formed around a peripheral edge of an opening of a passage 255.

An ultra low speed valve 241 (low pressure valve mechanism) is provided on a side of the bottom portion 244 of the rigid main valve 243, which is closer to the pilot chamber 253. The ultra low speed valve 241 includes an ultra low speed disc 258, an annular disc 259, and a retainer 260. The ultra low speed disc 258 has a circular shape, and is brought into abutment against a seat portion 257 formed around a peripheral edge of an opening of an introduction orifice 55 so as to be seatable thereon and separable therefrom. The annular disc 259 presses an outer peripheral edge portion of the ultra low speed disc 258. The retainer 260 supports an outer peripheral edge portion of the annular disc 259.

The ultra low speed disc 258 and the annular disc 259 are provided in a recessed portion 249 formed in the bottom portion 244 of the rigid main valve 243. The annular disc 259 has a plurality of cutouts 262 formed in its inner peripheral edge portion. When the ultra low speed disc 258 is opened, the cutouts 262 bring the introduction orifice 55 and the pilot chamber 253 into communication with each other. An outer peripheral edge portion of the retainer 260 is pressed against an outer peripheral edge portion of the bottom portion 244 of the rigid main valve 243 by a valve spring 261 provided between the bottom portion 244 of the rigid main valve 243 and the flange portion 252 of the pilot body 251.

A main flow in the second embodiment is a flow of an oil liquid passing through the main passage 225 (see FIG. 4) that allows communication between a recessed portion 96 on one end side of the main body 73 and a downstream side of the rigid main valve 243. The main passage 225 includes a plurality of passages 97 in the main body 73, a valve chamber 265, and the cutout 247 of the sleeve 246. The valve chamber 265 is defined on an inner periphery side of the seat portion 76. The main passage 225 allows the oil liquid, which has been introduced from a connection port 13 (see FIG. 1) into the valve chamber 265 via the plurality of passages 97, to be discharged via the rigid main valve 243 into the flow path 74 communicating with the reservoir 6.

Meanwhile, a pilot flow in the second embodiment is a flow of the oil liquid passing through a pilot passage 226 (see FIG. 4). The oil liquid is introduced from the connection port 13 (see FIG. 1) into the pilot chamber (back-pressure chamber) 253 via the recessed portion 96 of the main body 73, the plurality of passages 97, the valve chamber 265 defined between the main body 73 and the rigid main valve 243, the introduction orifice 55, and the ultra low speed valve 241 (low speed valve mechanism). When the pilot valve 123 is opened and the damping force has a soft characteristic, the pilot passage 226 allows the oil liquid to be discharged via a shaft hole 183 of a washer 182 and the passage 165 in the cap 157 into the flow path 74 communicating with the reservoir 6.

According to the second embodiment, when the damping force adjustable shock absorber operates in the soft mode, the piston is performing the extension stroke, and the piston speed falls within the ultra low speed range, the communication between the upper cylinder chamber 2A and the reservoir 6 is interrupted by the ultra low speed valve 241 (low speed valve mechanism) provided in the pilot passage 226. The interruption of the communication compresses the oil liquid in the upper cylinder chamber 2A when the piston is performing the extension stroke and the piston speed falls within the ultra low speed range. Thus, the differential pressure is generated between the upper cylinder chamber 2A side and the lower cylinder chamber 2B side of the extension-side ultra low speed valve 108. As a result, when the piston speed falls within the ultra low speed range, the extension-side ultra low speed valve 108 is opened. Thus, the damping force having the valve characteristic achieved by the ultra low speed valve 108 can be generated.

Further, when the damping force adjustable shock absorber operates in the soft mode, the piston is performing the compression stroke, and the piston speed falls within the ultra low speed range, the communication between the upper cylinder chamber 2A and the reservoir 6 is interrupted by the ultra low speed valve 241 (low speed valve mechanism) provided in the pilot passage 226. The interruption of the communication enables expansion of the oil liquid in the upper cylinder chamber 2A when the piston is performing the compression stroke and the piston speed falls within the ultra low speed range. Thus, the differential pressure is generated between the upper cylinder chamber 2A side and the lower cylinder chamber 2B side of the compression-side ultra low speed valve 105. As a result, when the piston speed falls within the ultra low speed range, the compression-side ultra low speed valve 105 is opened. Thus, the damping force having the valve characteristic achieved by the ultra low speed valve 105 can be generated.

(Third Embodiment) Next, a third embodiment is described with reference to FIG. 8. Here, differences from the first embodiment and the second embodiment are described. The same names and reference symbols are used for parts common to the first embodiment and the second embodiment, and an overlapping description thereof is omitted.

The damping force adjustment mechanism 242 of the second embodiment includes the valve chamber 265. The valve chamber 265 is defined between the main body 73 and the rigid main valve 243 when the rigid main valve 243 (introduction orifice defining member) having the introduction orifice member 55 is seated on the seat portion 76 having the annular shape of the main body 73. Further, in the second embodiment, the ultra low speed valve 241 (low speed valve mechanism) including the ultra low speed disc 258 is provided on the bottom portion 244 of the rigid main valve 243.

Meanwhile, a damping force adjustment mechanism 272 of the third embodiment includes the valve chamber 265. The valve chamber 265 is defined between a rigid main valve 273 and a joint member 285 when the rigid main valve 273 (introduction orifice defining member) having the introduction orifice member 55 is seated on the joint member 285. Further, in the third embodiment, the ultra low speed valve 271 (low speed valve mechanism) including the ultra low speed disc 258 is provided on a bottom portion 274 of the rigid main valve 273.

Figure 8:
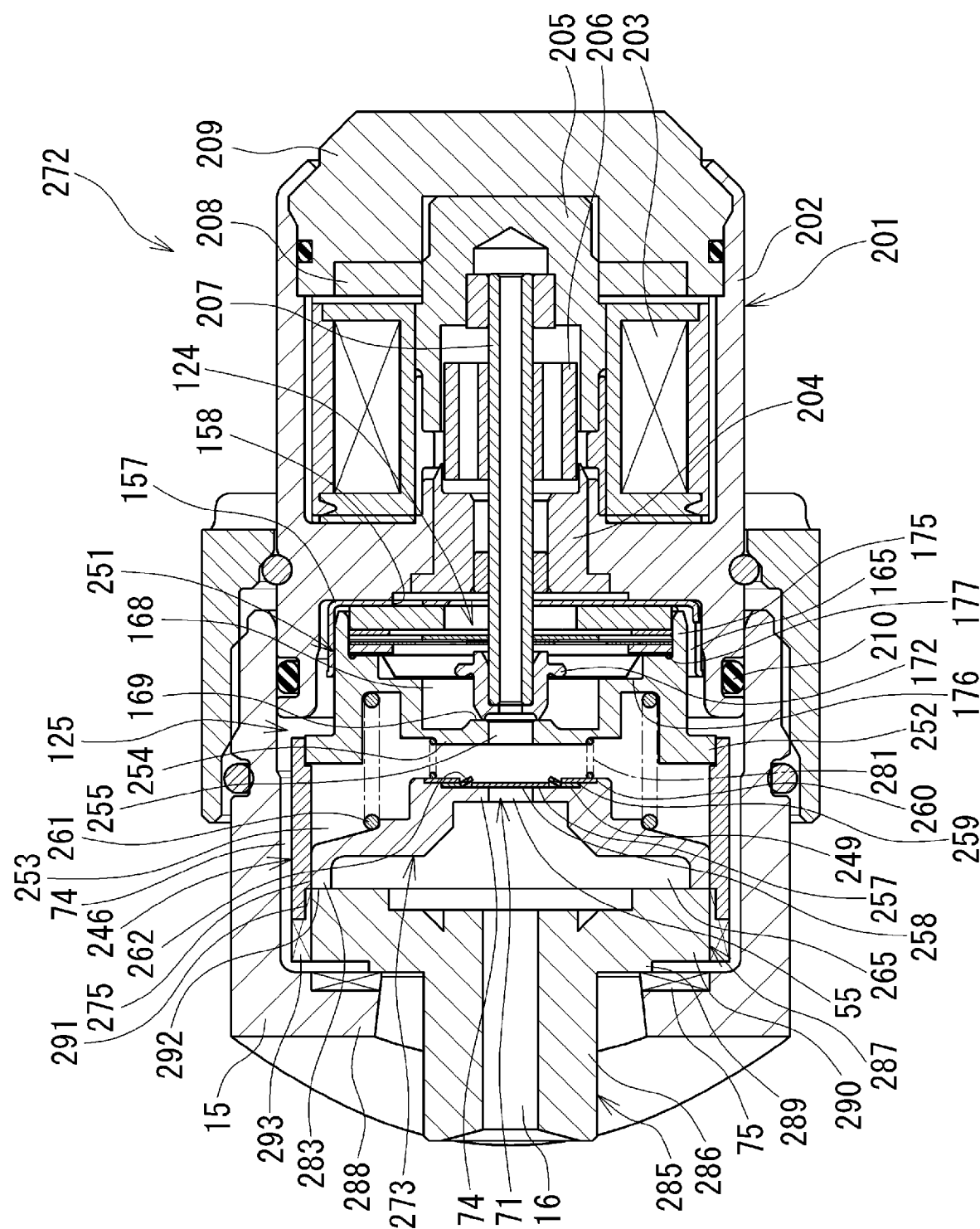
FIG. 8 is a sectional view of a damping force adjustment mechanism in a damping force adjustable shock absorber according to a third embodiment.

The rigid main valve 273 is formed in a bottomed cylindrical shape that is open on the joint member 285 side (left side in FIG. 8). The rigid main valve 273 has an introduction orifice 55 formed in its bottom portion 274. A valve portion 283 having an annular shape is formed on an outer peripheral edge portion of the rigid main valve 273. The valve portion 283 is brought into abutment against a seat portion 292 formed on an end surface of a stepped flange portion 287 of the joint member 285 so as to be seatable thereon and separable therefrom. The rigid main valve 273 has an outer peripheral portion 275 that is slidably inserted on an inner periphery side of a sleeve 246 having a cylindrical shape.

The joint member 285 includes a tubular portion 286 and the stepped flange portion 287. The tubular portion 286 has a cylindrical shape, and is inserted into a connection port 13 (see FIG. 1). The stepped flange portion 287 is accommodated in a case 15. The stepped flange portion 287 includes a small-diameter portion 289 located on a side closer to the tubular portion 286. The small-diameter portion 289 is brought into abutment against an inward flange portion 288 of the case 15. The stepped flange portion 287 includes a large-diameter portion 290 having a step portion 291. An end portion of the sleeve 246, which is on a side (left side in FIG. 8) closer to the joint member 285, is press-fitted into the step portion 291. The large-diameter portion 290 of the joint member 285 has an outer peripheral portion with a cutout 293. The cutout 293 allows communication of the main passage 225 (see FIG. 4) with a flow path 74 on an outer side of a valve block 125.

An ultra low speed valve 271 (low pressure valve mechanism) is provided on a side of the bottom portion 274 of the rigid main valve 273, which is closer to the pilot chamber 253. The ultra low speed valve 271 includes an ultra low speed disc 258, an annular disc 259, and a retainer 260. The ultra low speed disc 258 has a circular shape, and is brought into abutment against a seat portion 257 formed around the peripheral edge of an opening of the introduction orifice 55 so as to be seatable thereon and separable therefrom. The annular disc 259 presses the outer peripheral edge portion of the ultra low speed disc 258. The retainer 260 supports the outer peripheral edge portion of the annular disc 259.

The ultra low speed disc 258 and the annular disc 259 are provided in a recessed portion 249 formed in the bottom portion 274 of the rigid main valve 273. The annular disc 259 has a plurality of cutouts 262 formed in its inner peripheral edge portion. When the ultra low speed disc 258 is opened, the cutouts 262 bring the introduction orifice 55 and the pilot chamber 253 into communication with each other. An outer peripheral edge portion of the retainer 260 is pressed by a spring force of a compression helical spring 281 that is provided between a bottom portion 244 of the rigid main valve 273 and a bottom portion 254 of a pilot body 251. When a valve-opening stroke of the rigid main valve 273 is excessively large to result in an excessively large spring force of the compression helical spring 281, the compression helical spring 281 and the retainer 260 may be eliminated. In this case, a portion of the annular disc 259, in which the cutouts 262 are formed, may be provided with a spring property.

A main flow in the third embodiment is a flow of an oil liquid passing through the main passage 225 (see FIG. 4) that allows communication between a flow path 116 of the joint member 285 and a downstream side of the rigid main valve 243. The main passage 225 includes a valve chamber 265 and the cutout 293 of the joint member 285. The valve chamber 265 is defined between the joint member 285 and the rigid main valve 273. The main passage 225 allows the oil liquid, which has been introduced from a connection port 13 (see FIG. 1) into the valve chamber 265, to be discharged via the rigid main valve 273 into a flow path 74 communicating with a reservoir 6.

Meanwhile, a pilot flow in the third embodiment is a flow of the oil liquid passing through the pilot passage 226 (see FIG. 4). The oil liquid is introduced from the connection port 13 (see FIG. 1) into the pilot chamber (back-pressure chamber) 253 via the flow path 116 of the joint member 285, the valve chamber 265, the introduction orifice 55, and the ultra low speed valve 271 (low speed valve mechanism). When the pilot valve 123 is opened and the damping force has a soft characteristic, the pilot passage 226 allows the oil liquid to be discharged via a shaft hole 183 of the washer 182 and the passage 165 in the cap 157 into the flow path 74 communicating with the reservoir 6.

According to the third embodiment, when the damping force adjustable shock absorber operates in the soft mode, the piston is performing the extension stroke, and the piston speed falls within the ultra low speed range, the communication between the upper cylinder chamber 2A and the reservoir 6 is interrupted by the ultra low speed valve 271 (low speed valve mechanism) provided in the pilot passage 226. The interruption of the communication compresses the oil liquid in the upper cylinder chamber 2A when the piston is performing the extension stroke and the piston speed falls within the ultra low speed range. Thus, the differential pressure is generated between the upper cylinder chamber 2A side and the lower cylinder chamber 2B side of the extension-side ultra low speed valve 108. As a result, when the piston speed falls within the ultra low speed range, the extension-side ultra low speed valve 108 is opened. Thus, the damping force having the valve characteristic achieved by the ultra low speed valve 108 can be generated.

Further, when the damping force adjustable shock absorber operates in the soft mode, the piston is performing the compression stroke, and the piston speed falls within the ultra low speed range, the communication between the upper cylinder chamber 2A and the reservoir 6 is interrupted by the ultra low speed valve 271 (low speed valve mechanism) provided in the pilot passage 226. The interruption of the communication enables expansion of the oil liquid in the upper cylinder chamber 2A when the piston is performing the compression stroke and the piston speed falls within the ultra low speed range. Thus, the differential pressure is generated between the upper cylinder chamber 2A side and the lower cylinder chamber 2B side of the compression-side ultra low speed valve 105. As a result, when the piston speed falls within the ultra low speed range, the compression-side ultra low speed valve 105 is opened. Thus, the damping force having the valve characteristic achieved by the ultra low speed valve 105 can be generated.

Figure 9:
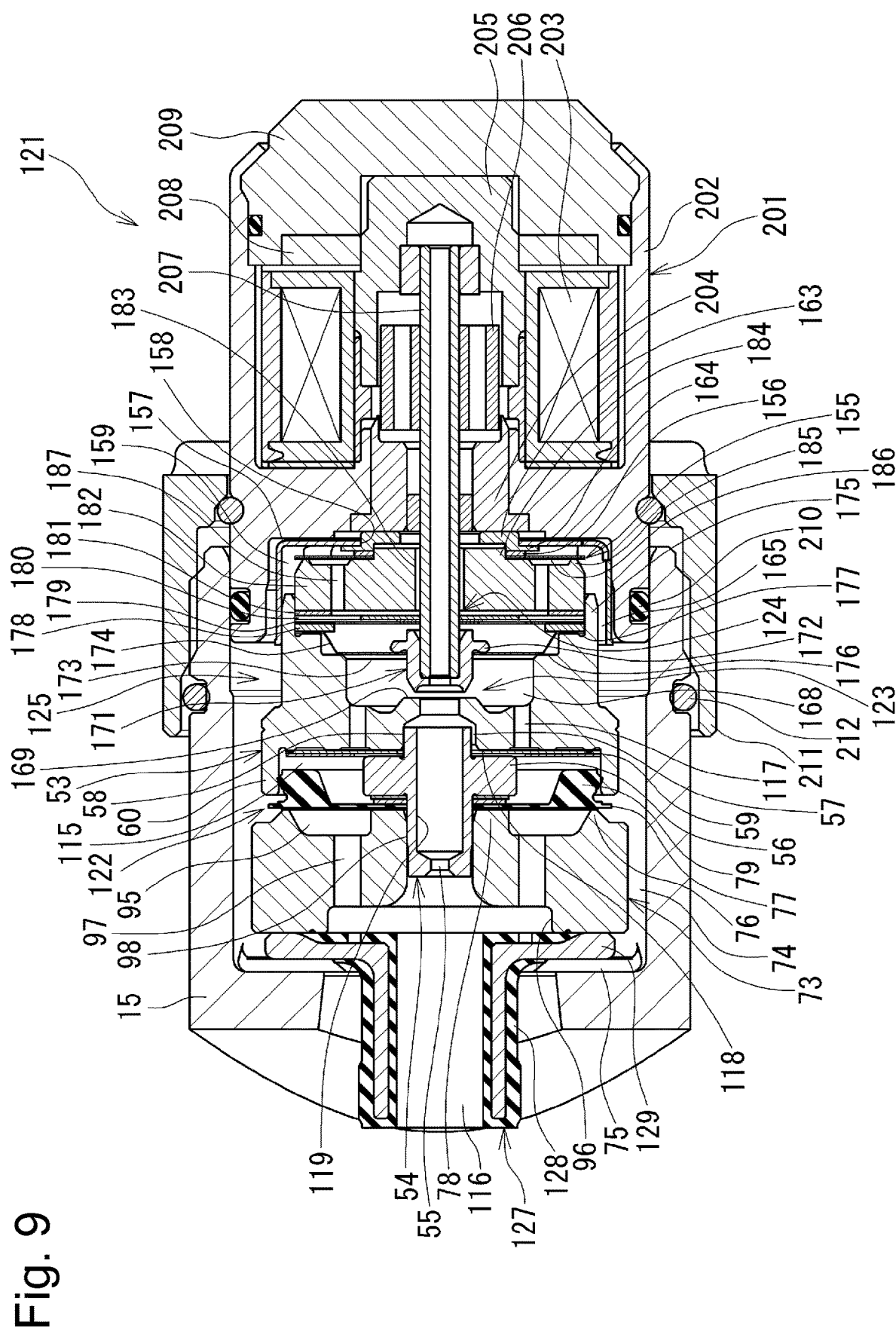
FIG. 9 is a sectional view of a damping force adjustment mechanism in a damping force adjustable shock absorber according to a fourth embodiment.

(Fourth Embodiment) Next, a fourth embodiment is described with reference to FIG. 9. Here, differences from the first embodiment are described. The same names and reference symbols are used for parts common to the first embodiment, and an overlapping description thereof is omitted.

In the first embodiment, the ultra low speed valve 231 (low speed valve mechanism) is provided on the inner periphery side of the tubular portion 238 of the pilot pin 54, specifically, in the shaft hole 119 of the pilot pin 54. Meanwhile, in the fourth embodiment, an ultra low speed valve 155 (low speed valve mechanism) is provided in a cap chamber 159 of a damping force adjustment mechanism 121. The ultra low speed valve 155 is seated on and separated from a washer 182 (lid member).

A fail-safe spring 174, a retainer 178, a fail-safe disc 179, a retainer 180, a spacer 81, and the washer 182 are stacked on one another and inserted into a cylindrical portion 175 of a pilot body 53 (case member). The washer 182 has a shaft hole 183 into which an operating rod 207 is inserted. The washer 182 has a mounting boss 184 formed in a center of its end surface on a side opposite to a valve chamber 168. The washer 182 has a seat portion 185 having an annular shape. The seat portion 185 is formed on an outer peripheral edge portion of the end surface of the washer 182, which is on the side opposite to the valve chamber 168. The washer 182 has an annular recessed portion 186. The annular recessed portion 186 is formed in an end surface of the washer 182, which is on the side opposite to the valve chamber 168, and is located between the mounting boss 184 and the seat portion 185. The washer 182 has a plurality of passages 187 that allow communication between the annular recessed portion 186 and the valve chamber 168.

The ultra low speed valve 155 is mounted in the mounting boss 184 of the washer 182, and has an outer peripheral edge portion that is in abutment against the seat portion 185 so as to be seatable thereon and separable therefrom. An inner peripheral edge portion of the ultra low speed valve 155, a spacer 156, and a cap holder 163 are located in the stated order from the washer 182 side between an outer peripheral edge portion of a base of the mounting boss 184 of the washer 182 and a core 204 described later. This structure allows the inner peripheral edge portion of the ultra low speed valve 155 to be clamped.

The cap holder 163 is fitted into a shaft hole 158 in a bottom portion of the cap 157. As a result, a cap chamber 159 is defined between the cap 157 and the washer 182. The ultra low speed valve 155 is provided in the cap chamber 159. The cap holder 163 has a shaft hole (reference symbol is omitted) and a flange portion 164. The operating rod 207 is inserted into the shaft hole. The flange portion 164 supports an outer peripheral edge portion of the shaft hole 158 of the cap 157. The passage 165 that allows the cap chamber 159 and a flow path 74 on an outer side of a valve block 125 to always communicate with each other is defined between the cap 157 and a pilot body 53.

The main flow of the fourth embodiment is a flow of the oil liquid passing through the main passage 225 (see, FIG. 4). The main passage 225 brings the recessed portion 96 formed in the one end of the main body 73 and the downstream side of the main valve 122 into communication with each other. The main passage 225 includes the plurality of passages 97 of the main body 73 and the annular passage 95. The main passage 225 allows the oil liquid, which has been introduced from the connection port 13 (opening) into the annular passage 95 via the plurality of passages 97, to be discharged via the main valve 122 into the flow path 74 communicating with the reservoir 6.

Meanwhile, the pilot flow is the flow of the oil liquid passing through the pilot passage 226 including the introduction passage (see FIG. 4). When a pilot valve 123 is opened and a damping force has a soft characteristic, the pilot passage 226 allows the oil liquid, which has been introduced from a connection port 13 (opening) into a valve chamber 168 via an introduction orifice 55, to be discharged via the plurality of passages 187 of the washer 182, the ultra low speed valve 155 (fourth low speed valve), the cap chamber 159, and the passage 165 into the flow path 74 communicating with the reservoir 6.

According to the fourth embodiment, when the damping force adjustable shock absorber operates in the soft mode, the piston is performing the extension stroke, and the piston speed falls within the ultra low speed range, the communication between the upper cylinder chamber 2A and the reservoir 6 is interrupted by the ultra low speed valve 155 provided in the pilot passage 226. The interruption of the communication compresses the oil liquid in the upper cylinder chamber 2A when the piston is performing the extension stroke and the piston speed falls within the ultra low speed range. Thus, the differential pressure is generated between the upper cylinder chamber 2A side and the lower cylinder chamber 2B side of the extension-side ultra low speed valve 108. As a result, when the piston speed falls within the ultra low speed range, the extension-side ultra low speed valve 108 is opened. Thus, the damping force having the valve characteristic achieved by the ultra low speed valve 108 can be generated.

Further, in the fourth embodiment, when the damping force adjustable shock absorber operates in the soft mode, the piston is performing the compression stroke, and the piston speed falls within the ultra low speed range, the communication between the upper cylinder chamber 2A and the reservoir 6 is interrupted by the ultra low speed valve 155 provided in the pilot passage 226. The interruption of the communication enables expansion of the oil liquid in the upper cylinder chamber 2A when the piston is performing the compression stroke and the piston speed falls within the ultra low speed range. Thus, a differential pressure is generated between the upper cylinder chamber 2A side and the lower cylinder chamber 2B side of the compression-side ultra low speed valve 105. As a result, when the piston speed falls within the ultra low speed range, the compression-side ultra low speed valve 105 is opened. Thus, the damping force having the valve characteristic achieved by the ultra low speed valve 105 can be generated.

Note that, the present invention is not limited to the embodiments described above, and includes further various modification examples. For example, in the embodiments described above, the configurations are described in detail in order to clearly describe the present invention, but the present invention is not necessarily limited to an embodiment that includes all the configurations that have been described. Further, a part of the configuration of a given embodiment can replace the configuration of another embodiment, and the configuration of another embodiment can also be added to the configuration of a given embodiment. Further, another configuration can be added to, deleted from, or replace a part of the configuration of each of the embodiments.

The present application claims a priority based on Japanese Patent Application No. 2019-105460 filed on Jun. 5, 2019. All disclosed contents including Specification, Scope of Claims, Drawings, and Abstract of Japanese Patent Application No. 2019-105460 filed on Jun. 5, 2019 are incorporated herein by reference in their entirety.

REFERENCE SIGNS LIST 1 damping force adjustable shock absorber, 2 cylinder, 18 piston, 21 piston rod, 41,42 damping force generating mechanism (valve mechanism), 55 introduction orifice, 115 pilot chamber, 121 damping force adjustment mechanism, 122 main valve, 123 pilot valve (control valve), 226 pilot passage, 231 ultra low speed valve (low speed valve mechanism)

The invention claimed is:

1. A damping force adjustable shock absorber, comprising:
a cylinder sealingly enclosing a working fluid;
a piston slidably fitted into the cylinder;
a valve mechanism, which is provided to the piston, and is configured to regulate a flow of the working fluid to generate a damping force;
a piston rod, which is coupled to the piston, and extends to an outside of the cylinder; and
a damping force adjustment mechanism configured to adjust the damping force, which is to be generated, by controlling the flow of the working fluid in the cylinder, which is caused by sliding of the piston, the damping force adjustment mechanism including:
a main valve to be opened under a pressure of the working fluid;
a pilot chamber configured to exert a pressure on the main valve in a valve-closing direction;
an introduction orifice configured to introduce the working fluid into the pilot chamber;
a pilot passage configured to allow communication between a downstream side of the introduction orifice and both of a downstream side of the pilot chamber and a downstream side of the main valve; and
a control valve provided in the pilot passage,
wherein a low speed valve mechanism is provided in the pilot passage between the control valve and the introduction orifice, the low speed valve mechanism having a flow passage area that is increased when a piston speed reaches a given piston speed lower than a piston speed at which the main valve is opened.

2. The damping force adjustable shock absorber according to claim 1, wherein the flow path area of the low speed valve mechanism is increased when the piston speed reaches 0.002 m/s.

3. The damping force adjustable shock absorber according to claim 2,
wherein the damping force adjustment mechanism includes an introduction orifice defining member that defines the introduction orifice, and
wherein the low speed valve mechanism is seatable on the introduction orifice of the introduction orifice defining member.

4. The damping force adjustable shock absorber according to claim 3,
wherein the introduction orifice defining member has a bottom portion with the introduction orifice and a tubular portion extending from one surface of the bottom portion,
wherein the main valve and the back-pressure chamber are located on an outer periphery side of the tubular portion, and
wherein the low speed valve mechanism is arranged on an inner periphery side of the tubular portion.

5. The damping force adjustable shock absorber according to claim 4,
wherein the damping force adjustment mechanism includes a case member having a valve chamber communicating with the back pressure chamber, and a lid member provided to one end of the case member, and
wherein the low speed valve mechanism is seatable on the lid member.

6. The damping force adjustable shock absorber according to claim 1,
wherein the damping force adjustment mechanism includes an introduction orifice defining member that defines the introduction orifice, and
wherein the low speed valve mechanism is seatable on the introduction orifice of the introduction orifice defining member.

7. The damping force adjustable shock absorber according to claim 6,
wherein the introduction orifice defining member has a bottom portion with the introduction orifice and a tubular portion extending from one surface of the bottom portion,
wherein the main valve and the back-pressure chamber are located on an outer periphery side of the tubular portion, and
wherein the low speed valve mechanism is arranged on an inner periphery side of the tubular portion.

8. The damping force adjustable shock absorber according to claim 7,
wherein the damping force adjustment mechanism includes a case member having a valve chamber communicating with the back pressure chamber, and a lid member provided to one end of the case member, and
wherein the low speed valve mechanism is seatable on the lid member.

9. A damping force adjustable shock absorber, comprising:
a cylinder sealingly enclosing a working fluid;
a piston slidably fitted into the cylinder;
a valve mechanism, which is provided to the piston, and is configured to regulate a flow of the working fluid to generate a damping force;
a piston rod, which is coupled to the piston, and extends to an outside of the cylinder; and
a damping force adjustment mechanism configured to adjust the damping force, which is to be generated, by controlling the flow of the working fluid in the cylinder, which is caused by sliding of the piston, the damping force adjustment mechanism including:
a main valve to be opened under a pressure of the working fluid;
a pilot chamber configured to exert a pressure on the main valve in a valve-closing direction;
an introduction orifice configured to introduce the working fluid into the pilot chamber;
a pilot passage configured to allow communication between a downstream side of the introduction orifice and both of a downstream side of the pilot chamber and a downstream side of the main valve; and a control valve provided in the pilot passage, wherein a low speed valve mechanism is provided in the pilot passage, the low speed valve mechanism having a flow passage area that is increased when a piston speed reaches a given piston speed lower than a piston speed at which the main valve is opened, wherein the damping force adjustment mechanism includes an introduction orifice defining member that defines the introduction orifice, wherein the low speed valve mechanism is seatable on the introduction orifice of the introduction orifice defining member, wherein the introduction orifice defining member has a bottom portion with the introduction orifice and a tubular portion extending from one surface of the bottom portion, wherein the main valve and the back-pressure chamber are located on an outer periphery side of the tubular portion, and wherein the low speed valve mechanism is arranged on an inner periphery side of the tubular portion.

10. A damping force adjustable shock absorber, comprising:

a cylinder sealingly enclosing a working fluid;

a piston slidably fitted into the cylinder;

a valve mechanism, which is provided to the piston, and is configured to regulate a flow of the working fluid to generate a damping force;

a piston rod, which is coupled to the piston, and extends to an outside of the cylinder; and a damping force adjustment mechanism configured to adjust the damping force, which is to be generated, by controlling the flow of the working fluid in the cylinder, which is caused by sliding of the piston, the damping force adjustment mechanism including:

a main valve to be opened under a pressure of the working fluid;

a pilot chamber configured to exert a pressure on the main valve in a valve-closing direction;

an introduction orifice configured to introduce the working fluid into the pilot chamber;

a pilot passage configured to allow communication between a downstream side of the introduction orifice and both of a downstream side of the pilot chamber and a downstream side of the main valve; and a control valve provided in the pilot passage, wherein a low speed valve mechanism is provided in the pilot passage, the low speed valve mechanism having a flow passage area that is increased when a piston speed reaches a given piston speed lower than a piston speed at which the main valve is opened, wherein the flow path area of the low speed valve mechanism is increased when the piston speed reaches 0.002 m/s, wherein the damping force adjustment mechanism includes an introduction orifice defining member that defines the introduction orifice, and wherein the low speed valve mechanism is seatable on the introduction orifice of the introduction orifice defining member, wherein the introduction orifice defining member has a bottom portion with the introduction orifice and a tubular portion extending from one surface of the bottom portion, wherein the main valve and the back-pressure chamber are located on an outer periphery side of the tubular portion, and wherein the low speed valve mechanism is arranged on an inner periphery side of the tubular portion.

* * * * *